(No Model.)
T. M. FOOTE.
DEVICE FOR THE ADJUSTMENT AND TESTING OF ELECTRIC CARS.
No. 434,181. Patented Aug. 12, 1890.
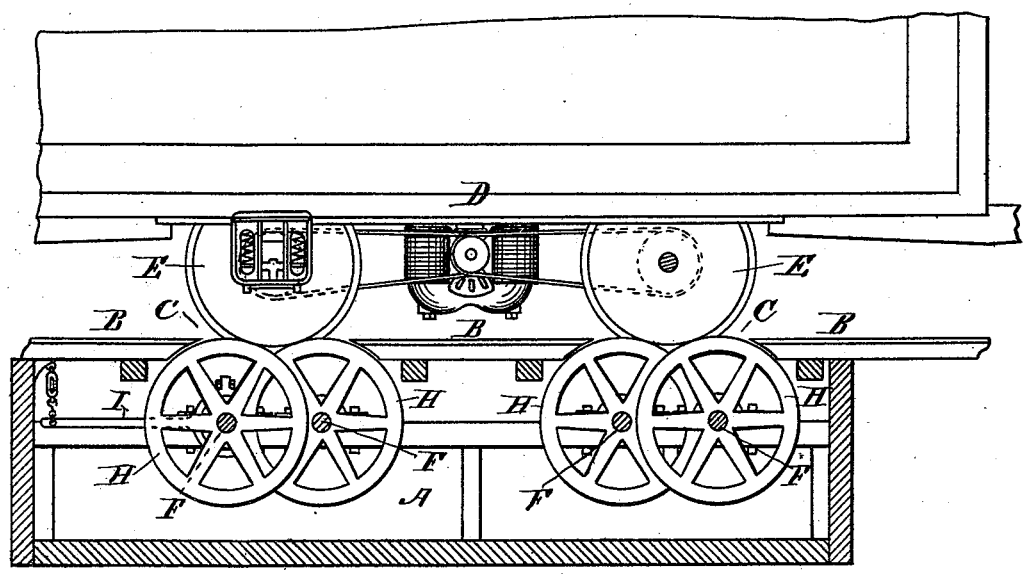
Fig. 1.
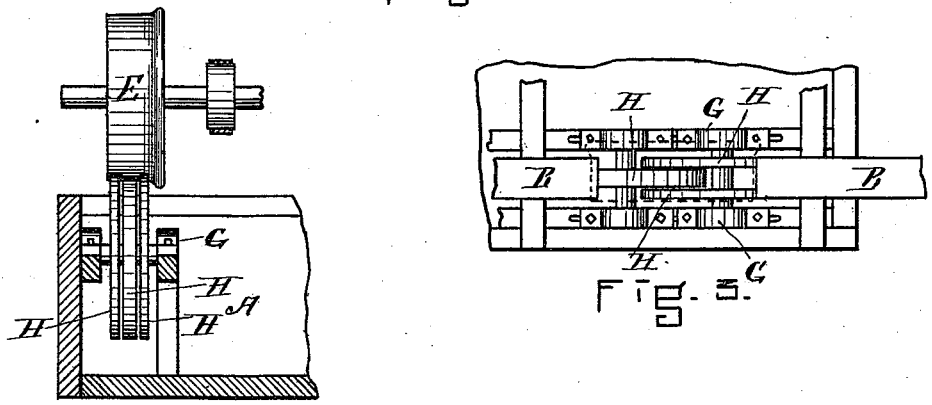
Fig. 2.
Fig. 3.
WITNESSES.
Frank G. Parker
C. J. Pillsbury
INVENTOR.
Theodore M. Foote
by his attorney
Alex. L. Hayes

UNITED STATES PATENT OFFICE.

THEODORE M. FOOTE, OF BOSTON, MASSACHUSETTS.

DEVICE FOR THE ADJUSTMENT AND TESTING OF ELECTRIC CARS.

SPECIFICATION forming part of Letters Patent No. 434,181, dated August 12, 1890.

Application filed October 7, 1889. Serial No. 326,182. (No model.)

*To all whom it may concern:*

Be it known that I, THEODORE M. FOOTE, of Boston, in the county of Suffolk and State of Massachusetts, have invented a new and useful Improvement in a Device for Facilitating the Adjustment and Testing of Electric Cars, of which the following, taken in connection with the accompanying drawings, is a specification.

In order to insure the proper adjustment of the mechanism of an electric car it is necessary before the car is put into actual service that this mechanism should be operated for a short time. The first thing which it is required to determine is the proper adjustment of the gearing to the motor, and the next is the proper adjustment of the car-body to the truck and its mechanism.

This invention relates to means for obtaining these adjustments without moving the car from the car-house, and under similar conditions to those under which the car operates when in actual service with its load, and also while in a position which enables the mechanism to be inspected and reached while in motion, and by which inequalities of frictional bearing may be ascertained, short-circuits discovered, the brushes readjusted, and the like.

Figure 1 is a view, partly in elevation and partly in section, of a device which embodies the principle of my invention. Fig. 2 is an end elevation of a portion of this device, showing a car-wheel in position thereon. Fig. 3 is a plan of a portion of said device.

In these several figures the same letters refer to the same parts.

Referring to the drawings, A is a pit under the car-track, over which pit the rails B B extend, except at two spaces C C, at a distance from one another equal to the space between the wheels of the car in use on the road.

D is the electric car, and E are the wheels of the same.

F F are parallel axles supported on suitable bearings G under the interrupted space in each rail. The bearings are preferably made capable of longitudinal adjustment to allow for difference in the distances between the wheels of a car. Each of these axles carries a wheel H, and these wheels rotate in parallel planes. The faces of these wheels are tangential to the plane of the rail-surface and form a continuation of the surface, so that the car easily passes onto these faces and is supported by the wheels. The face of one of the wheels forms a bearing for the tread of the car-wheel, and the flange of the wheel bears against the rim of the other wheel, so as to keep the car-wheel in position. I have represented one of the axles as carrying two wheels, and the wheel on the other axle as rotating between these wheels; but this second wheel on the axle is not necessary for the operation of the device, and one wheel on each axle will be sufficient to accomplish the desired result. It is preferable that the faces of these wheels H H should conform to the shape of the rail-surface and that the width of the surface afforded by the rotating wheels should be equal to the width of the tread of the wheel. When the car passes onto these rotating surfaces, it is obvious that it will be supported thereby, and that when the car-wheels rotate the car cannot move either forward or backward, for the reason that the wheels rest upon two rotating bearing-surfaces and that the inner surface prevents the onward movement of the car. I have shown the arrangement of a series of these rotating surfaces under each axle of the car, and this arrangement is used when the power is applied to each axle; but when the power is applied to but one axle it will not be necessary to use but one set of wheels. For the reason that there are two rotating surfaces under the wheels it is obvious that, as before stated, the car will remain in a stationary position when the wheels are rotated; but when these rotating surfaces are prevented from rotating the car will move off these surfaces onto the rails. By means of this device it is rendered possible to operate, without moving the car, the mechanism of an electric car as long as may be necessary; also it is rendered possible to secure the proper adjustment of the parts and inspect the mechanism from underneath while in operation. The power of the motor when the entire weight of the car is upon its axle can be measured by a suitable dynamometer I, connected to the axle of the rotating surface upon which the car rests. Any ordinary dynamometer adapted for the purpose may be employed, and a specific description or representation thereof is deemed unnecessary. This determination of the power of the motor under the condition of actual service will be of great advantage to the electrical engineer.

Having thus described my invention, what I claim, and desire to secure by Letters Patent of the United States, is—

1. The combination of a railroad-track, the rails of which are provided with interrupting spaces opposite each other which break the continuity of the rails, and two overlapping wheels journaled to rotate in parallel planes in each of said spaces.

2. The combination of a railroad-track, the rails of which are provided with interrupting spaces opposite each other which break the continuity of the rails, and two overlapping wheels journaled to rotate in parallel planes in each of said spaces, the journals of said wheels being adjustable.

3. The combination of a railroad-track, the rails of which are provided with interrupting spaces opposite each other which break the continuity of the rails, and two wheels journaled to rotate in parallel planes in each of said spaces, the periphery of one of said wheels having a circumferential recess and the periphery of the other wheel projecting into said recess.

In testimony whereof I have signed my name to this specification, in the presence of two subscribing witnesses, on this 2d day of October, A. D. 1889.

THEODORE M. FOOTE.

Witnesses:
ALEX. L. HAYES,
CHAS. J. PILLSBURY.